(12) United States Patent
Callway et al.

(10) Patent No.: US 9,544,523 B2
(45) Date of Patent: Jan. 10, 2017

(54) WIRELESS DISPLAY APPARATUS AND METHOD

(75) Inventors: Edward G. Callway, Toronto (CA); David Glen, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 976 days.

(21) Appl. No.: 09/923,768

(22) Filed: Aug. 6, 2001

(65) Prior Publication Data
US 2003/0027517 A1 Feb. 6, 2003

(51) Int. Cl.
*H04N 7/18* (2006.01)
*H04N 5/44* (2011.01)
(Continued)

(52) U.S. Cl.
CPC .............. *H04N 5/4401* (2013.01); *G06F 3/14* (2013.01); *H04H 20/61* (2013.01); *H04H 20/72* (2013.01); *H04N 7/20* (2013.01); *H04N 21/40* (2013.01); *H04N 21/41* (2013.01); *H04N 21/4122* (2013.01); *H04N 21/4126* (2013.01); *H04N 21/42653* (2013.01); *H04N 21/436* (2013.01); *H04N 21/43637* (2013.01); *H04N 21/44004* (2013.01); *G06F 3/1423* (2013.01);
(Continued)

(58) Field of Classification Search
USPC ...................................... 725/34, 112
See application file for complete search history.

(56) References Cited

U.S. PATENT DOCUMENTS 5,708,961 A * 1/1998 Hylton et al. .................. 725/81
5,774,172 A * 6/1998 Kapell et al. ................. 725/139
(Continued)

FOREIGN PATENT DOCUMENTS

EP 0710017 A2 5/1996
EP 0762751 A2 3/1997

OTHER PUBLICATIONS

Definition of "drawing program." Microsoft Press Computer Dictionary, Third Edition. Microsoft Corporation. p. 1-3. 1997.*
(Continued)

*Primary Examiner* — Justin Shepard
(74) *Attorney, Agent, or Firm* — Faegre Baker Daniels LLP

(57) ABSTRACT

A wireless display system and method decompresses a compressed video stream, such as obtained from suitable video sources such as a cable modem, DVD player or other suitable source, to produce a decompressed video stream locally. The decompressed video stream, such as frames, is stored in a local frame buffer, such as an on-chip frame buffer, system memory, or any other suitable memory. The system and method then recompresses the stored frames and wirelessly transmits the recompressed frames using a short range wireless transmitter, such as a radio frequency-based short range transmitter, an infrared short range wireless transmitter, or any other suitable short range transmitter that may provide, for example, local area networking. Accordingly, full image frames are decompressed and then recompressed, such as via a software data encoder as executed by a central processing unit, or via a hardware data encoder, such as an MPEGII or MPEG4 encoder, or any other suitable encoder, and then modulated by a short range wireless transceiver and sent to a short range wireless unit having a local display.

1 Claim, 6 Drawing Sheets

(51) Int. Cl.

| | | |
|---|---|---|
| *H04N 21/436* | (2011.01) | |
| *H04N 21/40* | (2011.01) | |
| *H04N 21/41* | (2011.01) | |
| *G06F 3/14* | (2006.01) | |
| *H04H 20/61* | (2008.01) | |
| *H04H 20/72* | (2008.01) | |
| *H04N 7/20* | (2006.01) | |
| *H04N 21/426* | (2011.01) | |
| *H04N 21/4363* | (2011.01) | |
| *H04N 21/44* | (2011.01) | |
| *G09G 5/00* | (2006.01) | |
| *G09G 5/36* | (2006.01) | |
| *H04N 5/38* | (2006.01) | |
| *H04N 5/445* | (2011.01) | |
| *H04N 9/64* | (2006.01) | |

(52) U.S. Cl.
CPC ........... *G06F 3/1454* (2013.01); *G09G 5/006* (2013.01); *G09G 5/363* (2013.01); *G09G 2340/02* (2013.01); *G09G 2340/125* (2013.01); *G09G 2370/16* (2013.01); *H04N 5/38* (2013.01); *H04N 5/44504* (2013.01); *H04N 9/641* (2013.01)

(56) References Cited

U.S. PATENT DOCUMENTS

| | | | |
|---|---|---|---|
| 6,008,777 A * | 12/1999 | Yiu | 345/2.1 |
| 6,263,503 B1 * | 7/2001 | Margulis | 725/81 |
| 6,292,172 B1 * | 9/2001 | Makhlouf | 345/157 |
| 6,525,725 B1 * | 2/2003 | Deering | 345/419 |
| 6,564,304 B1 | 5/2003 | Van Hook et al. | |
| 6,580,422 B1 | 6/2003 | Reilly | |
| 6,630,933 B1 | 10/2003 | Van Hook | |
| 6,771,704 B1 * | 8/2004 | Hannah | 375/240.16 |
| 7,053,863 B2 | 5/2006 | Glen et al. | |
| 2001/0052130 A1 * | 12/2001 | Yap et al. | 725/90 |
| 2001/0054060 A1 * | 12/2001 | Fillebrown et al. | 709/201 |
| 2002/0077979 A1 | 6/2002 | Nagata | |
| 2002/0196378 A1 * | 12/2002 | Slobodin et al. | 348/744 |
| 2003/0071902 A1 | 4/2003 | Allen et al. | |
| 2006/0028399 A1 | 2/2006 | Glen et al. | |

OTHER PUBLICATIONS

Duval, Mary; Potential Wireless Applications & Interfaces for Projectors; Display Interfaces 2001, Anaheim, CA; Mar. 2001.
Venugopal, Madan et al.; Display Interfaces for High-Quality Wireless Video; Display Interfaces 2001, Anaheim, CA; Mar. 2001.
Foley, James D., "Computer Graphics: Principles and Practice, 2nd ed. in C," Addison-Wesley, Boston, 1996, pp. 19-20.

* cited by examiner

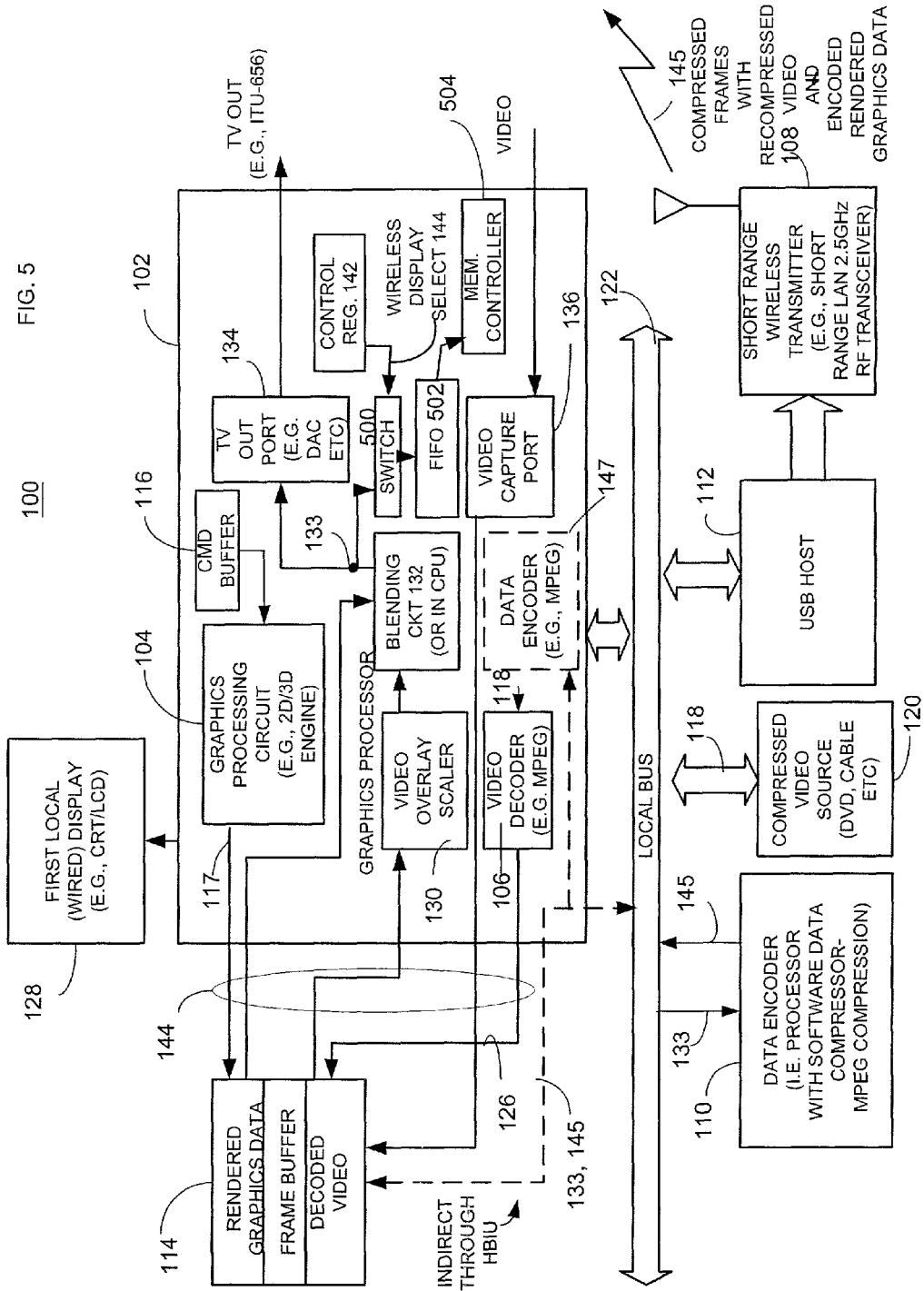

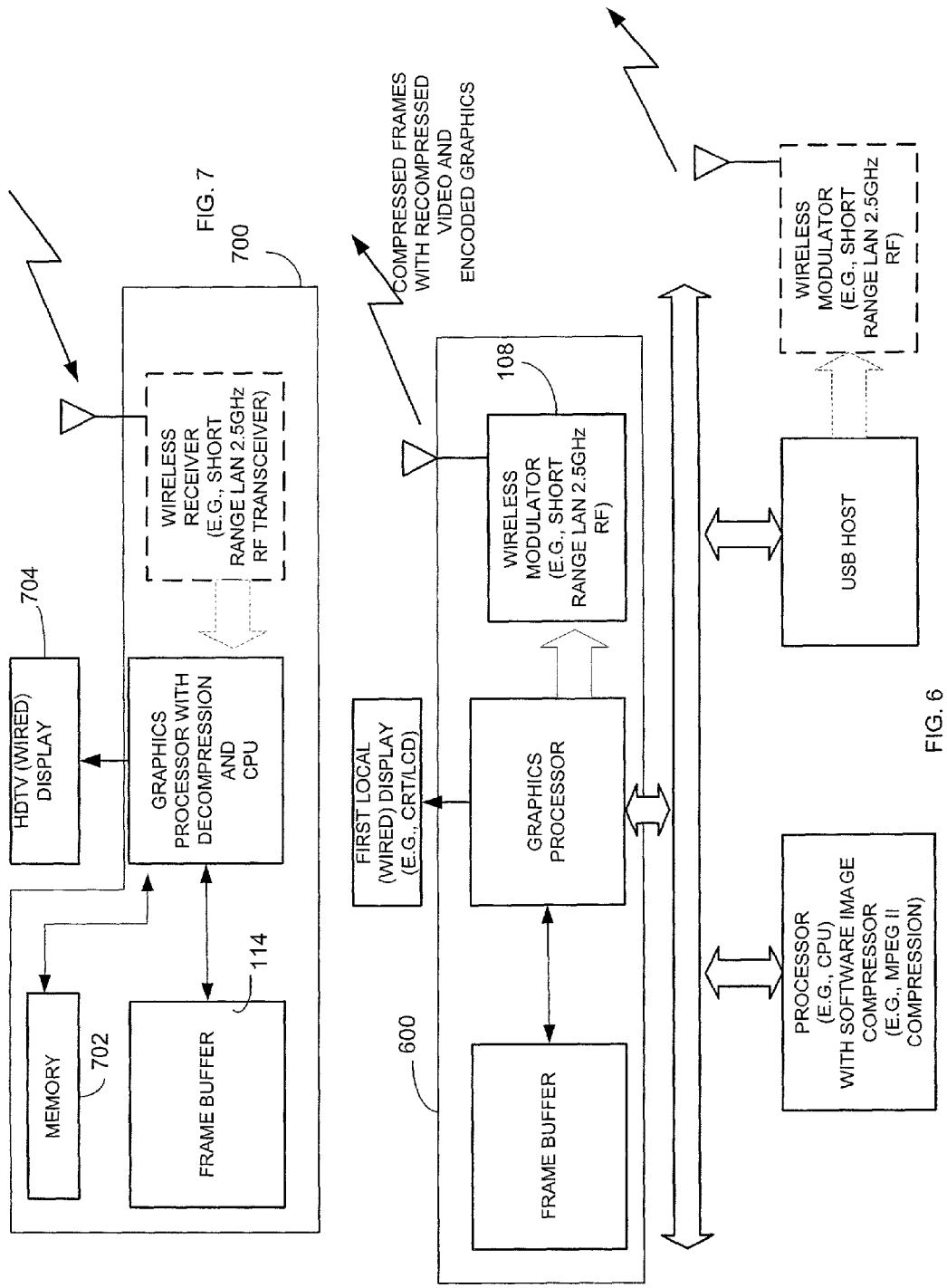

WIRELESS DISPLAY APPARATUS AND METHOD

RELATED CO-PENDING APPLICATION

This application is related to co-pending U.S. application Ser. No. 11/245,351, filed Oct. 5, 2005 entitled Wireless Device Method and Apparatus with Drawing Command Throttling Control, having as inventors David Glen and Edward G. Callway, owned by instant assignee and incorporated herein by reference, which is a divisional application of Ser. No. 09/923,759 filed Aug. 6, 2001, entitled Wireless Device Method and Apparatus with Drawing Command Throttling Control, having inventors David Glen and Edward G. Callway, owned by instant assignee and incorporated herein by reference.

FIELD OF THE INVENTION

The present invention relates generally to methods and apparatus that communicate wireless image information for display, and more particularly to wireless display devices.

BACKGROUND OF THE INVENTION

Wireless accessories for computers and other portable information appliances have been available for many years. For example, wireless keyboards, wireless mice, wireless printers and wireless modems may be operatively coupled to a computing device through an infrared (IRDA) communication link or other suitable wireless communication link. In addition, wireless radio frequency standards are being developed, such as Bluetooth (see e.g., www.bluetooth.com, IEEE 802.15.1, IEEE 802.11b) for local area network devices. However, the display devices associated with such devices typically still use a wired cable connection to the device. This is due in part to the large amounts of data, such as video pixel data, that must be passed from a frame buffer containing a rendered image, to the display device which may be an LCD panel, other digital panel or high resolution display device. LCD projectors and wall displays also typically have a cable interconnection between the source of the image information and the display device.

In addition, it is known to use image renderers, such as graphics accelerator chips, containing, for example, two dimensional and three dimensional rendering engines that interface with a main processor, such as a host CPU, to generate and present graphics and video information, in the form of overlays, and other video graphics images. However, systems that employ image rendering devices typically have hard wired connections between the image renderer, such as a graphics accelerator chip or host CPU, and a display device, such as an LCD, or high resolution monitor.

In display systems that employ multiple graphics accelerators to, for example, speed up the generation of a rendered image for video games and other multimedia applications, each graphics accelerator generates a different part of the same image or a completely different image. As such, with dual graphics processor based systems, the operating system typically has to know that the two graphics accelerators exist, and the software drivers associated with the graphics accelerators have to know that another software driver associated with the other graphics accelerator exists so that they may be used to draw other portions of the same image. In addition, each of the two graphics accelerator chips typically cannot use the same memory space and avoid system resource conflicts. Accordingly, operating systems are typically modified to accommodate parallel graphics accelerator operation. Operating systems typically send drawing requests to two different software drivers associated with the two graphics accelerators alternate between line or image frame rendering. Moreover, such systems are not known that employ anything other than a wired connection to a monitor device. Accordingly, such systems may require special operating systems and can be cumbersome to use since they require additional cabling.

Other network-based systems are known that may have, for example, a console that sends drawings commands over a wired network connection to a network display terminal. Such systems may, for example, send different drawing commands to different network display terminals based on which user is associated with a given network display terminal. A special operating system is used to control different commands to the different network display terminals. Accordingly, such systems can require cabling requirements as well as special operating system control.

Accordingly, a need exists for a wireless display device and method that allows the removal of a wired display connection to allow additional flexibility in displaying images.

BRIEF DESCRIPTION OF THE DRAWINGS

FIG. 5 is an alternative embodiment of a wireless display circuit in accordance with one embodiment of the invention;

FIG. 6 is a block diagram illustrating one example of a peripheral card for a wireless display system in accordance with one embodiment of the invention; and FIG. 7 is a block diagram illustrating one example of a wireless display circuit for use with a set top box in accordance with one embodiment of the invention.

DETAILED DESCRIPTION OF A PREFERRED EMBODIMENT OF THE INVENTION

Briefly, a wireless display system and method decompresses a compressed video stream, such as obtained from suitable video sources such as a cable modem, DVD player or other suitable source, to produce a decompressed video stream locally. The decompressed video stream, such as frames, is stored in a local frame buffer, such as an on-chip frame buffer, system memory, or any other suitable memory. The system and method then recompresses the stored frames and wirelessly transmits the recompressed frames using a short range wireless transmitter, such as a radio frequency-based short range transmitter, an infrared short range wireless transmitter, or any other suitable short range transmitter that may provide, for example, local area networking. Accordingly, full image frames are decompressed and then recompressed, such as via a software data encoder as executed by a central processing unit, or via a hardware data encoder, such as an MPEGII or MPEG4 encoder, or any other suitable encoder, and then modulated by a short range wireless transceiver to a short range wireless mother unit having a local display. The wireless receiving unit then receives, via a short range wireless receiver, the compressed video stream and decompresses the received compressed video stream to produce decompressed image frames. The receiving unit then displays the decompressed image frames on its local display. The resulting system and method provides a wireless display apparatus and methodology so that cabling is not required to provide image data from an image source to a receiving unit.

Figure 1:
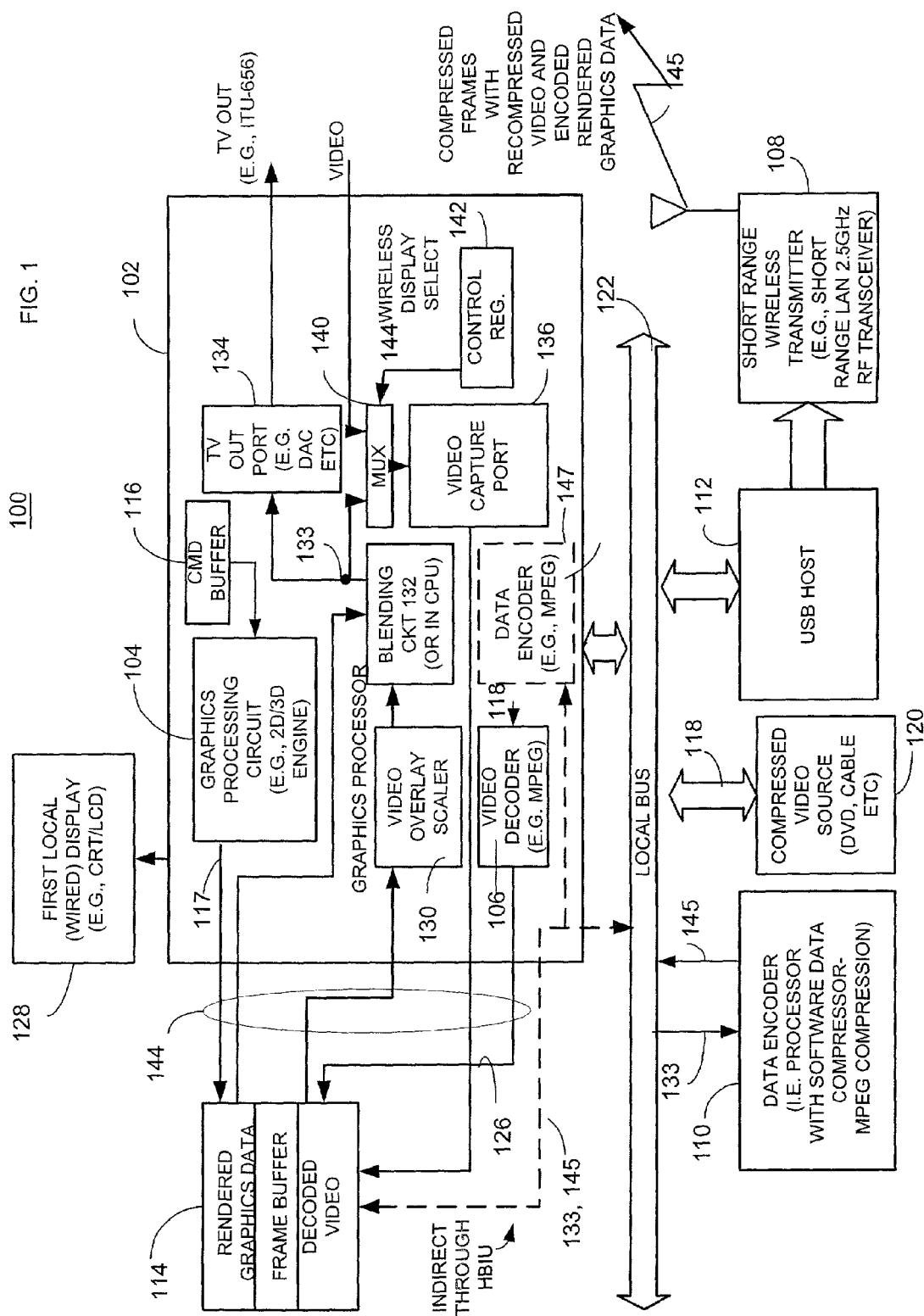
FIG. 1 is a block diagram illustrating one example of a wireless display circuit including a short range transmitter in accordance with one embodiment of the invention.
Figure 2:
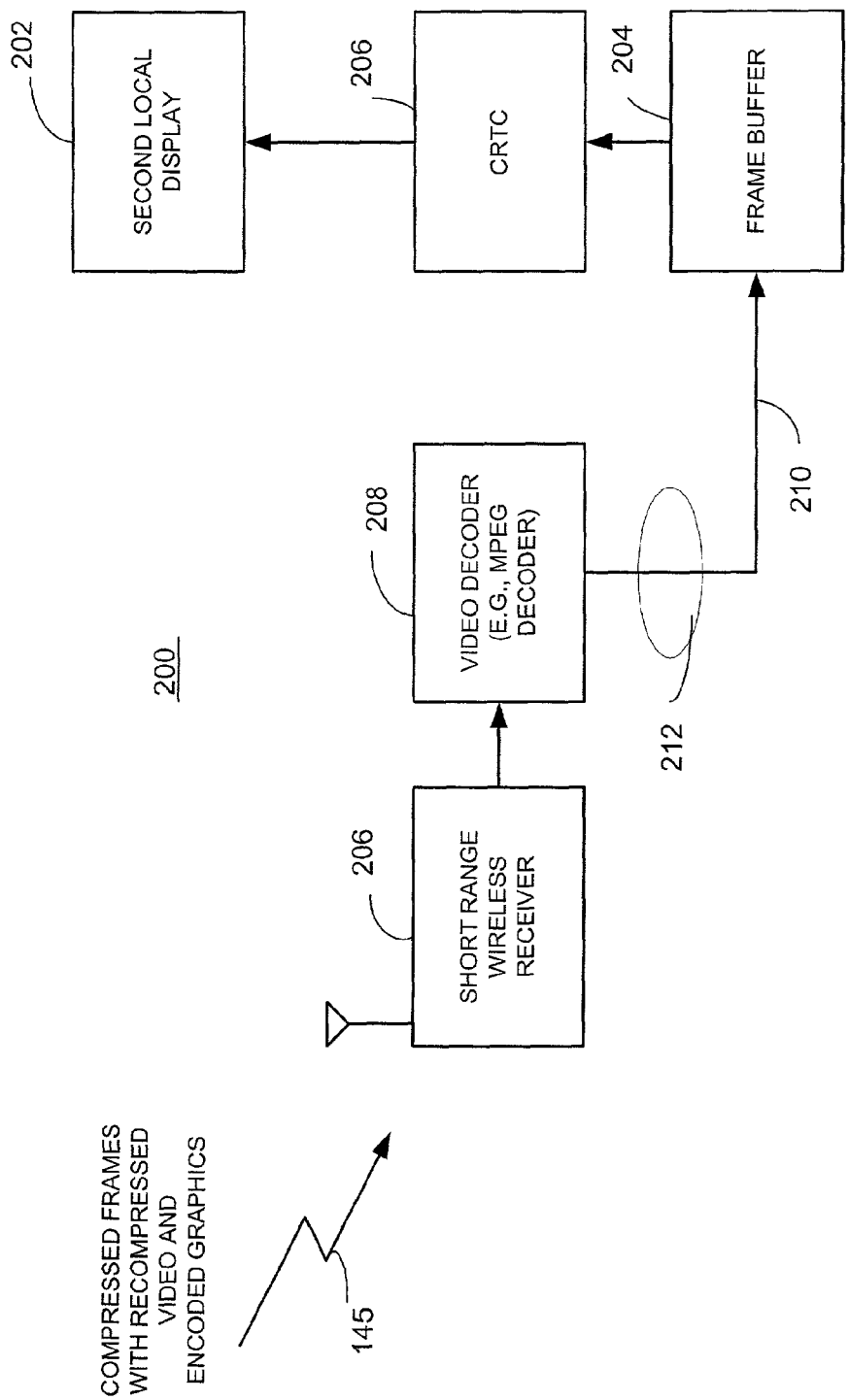
FIG. 2 is a block diagram illustrating one example of a wireless display circuit including a short range wireless receiver in accordance with one embodiment of the invention.

Referring to FIGS. 1 and 2, a wireless display system is shown that includes a first unit 100 that wirelessly transmits compressed image frames in the form of a video stream to a second unit 200 that wirelessly receives the compressed image frames and decompresses the received image frames for display on a local display 202. The first unit 100 includes a wireless display circuit 102 that includes a graphics processing circuit 104, a video decoder 106, a short range wireless transmitter 108 and a data encoder 110. In this embodiment, the data encoder 110 is a software data encoder executed on a processor such as a host processor in a computer, communication system or other processor based system.

In an alternative embodiment, the data encoder 110 may be a hardware data encoder such as an integrated circuit (shown by dashed lines 147) and may be co-located on a peripheral printed circuit board along with the graphics processing circuit 104. In addition, the short range wireless transmitter 108 is shown to be coupled to a USB host 112 but may also be coupled directly to the wireless display circuit 102 and may be resident, for example, on a same integrated circuit as the wireless display circuit 102 or may be on a same printed circuit board as the wireless display circuit 102.

The wireless display circuit 102 may be, for example, a graphics accelerator chip with standard graphics processing capabilities and video overlay capabilities as known in the art. Accordingly, the graphics processing circuit 104 may be a suitable 2D/3D graphics rendering engine that is operatively coupleable to a frame buffer 114 or any other suitable memory. The graphics processing circuit 104 receives graphics rendering commands from a command buffer 116 to render graphics data based on the rendering commands and stores rendered graphics data 117 in the frame buffer 114.

The wireless display circuit 102 may also include a conventional video decoder 106 such as an MPEG based video decoder that operates pursuant to the MPEG 2, MPEG 4 standard or any other suitable decoding algorithm. The video decoder 106 receives a compressed video stream 118 from, for example, a compressed video source 120 via a local bus 122, such as a PCI, AGP or any other suitable bus. The video decoder 106 produces decoded video 126 from the compressed video stream 118 for display on a local display 128, such as a CRT, LCD display or any other suitable display device. In this particular embodiment, the wireless display circuit 102 also includes a video overlay scaler 130 and a blending circuit 132. As known in the art, the video overlay scaler 130 suitably scales decoded video and overlays the scaled video with the rendered graphics data 117 to combine the rendered graphics data 117 and video as suitable image frames 133. A TV out port 134 converts digital image data into analog TV out signals, such as compliant with the ITU-656 standard or any other suitable standard. The wireless display circuit 102 also includes a video capture port 136 that receives decoded video from a suitable video source, such as another MPEG decoder, analog decoder or ITU-656 interface, and stores the captured video as decoded video in the frame buffer 114.

The wireless display circuit 102 also includes a multiplexing circuit 140 that is operatively coupled to an output of the blending circuit 132 to receive image frames 133 that are produced by blending rendered graphics data and decoded video. The multiplexing circuit 140 is also operatively coupled to receive digital video for the video capture port such as from any suitable source. The multiplexing circuit 140 is then controlled via a control register 142 via one or more control bits 144. The control register 142 stores wireless display select control bits which indicate whether a wireless display mode has been selected.

If the wireless display mode has been selected, the control bits 144 will control the multiplexer 140 to select the output frames 133 from the blending circuit 132 to be input to the video capture port 136 which stores decoded video (with graphic) frames in the frame buffer. In this embodiment, since as known in the art a video capture port can write to the frame buffer, an additional memory writing circuit may not be necessary.

The data encoder 110, in this example, is a software data encoder, that is executed by suitably programmed processor that is operatively coupled to the frame buffer 114 via the local bus 122 and local bus 144. These buses are considered local since they physically connect the various blocks. In this example, the data encoder 110 carries out MPEG encoding on the image frames 133 output by the blending circuit 132 and stored via the video capture port during the wireless display select mode. Accordingly, the data encoder 110 encodes the rendered graphics data and the decoded video that have been suitably blended to produce compressed image frames 145 containing recompressed video with encoded graphics data. Since the compressed video 118 was decompressed via video decoder 106, the video retrieved for the overlay scaler 130 has already been decoded once. Accordingly, the data encoder 110 recompresses the video (and compresses the rendered graphics data since it is in the same stream as the video). The data encoder 110 is operatively coupled also to the short range wireless transmitter 108, in this embodiment, through local bus 122 and USB host 112. The short range wireless transmitter 108 transmits the encoded rendered graphics data and recompressed decoded video which is in the form of suitable modulated compressed frames 145 to a short range wireless receiver 206 in the second unit 200.

As shown by dashed lines 147, the data encoder may also be a hardware-based MPEG encoder that is operatively coupled to the frame buffer 114 via local bus 144 and suitably encodes the image frames 133 output by the blending circuit 132 after they have been multiplexed to the video capture port 136 and stored in the frame buffer 114. The data encoder 110 is then suitably coupled to the short range wireless transmitter 108 via the local bus 122 and the USB host 112.

The wireless transmitter 108 may be part of a wireless short range transceiver compliant with the Bluetooth standard and may utilize, for example, a 750 kilobit/sec stream. This may occur, for example, where the data encoder 110 is an MPEG 4-based encoder and accordingly, a Bluetooth-compliant transceiver may be employed. However, where an MPEG2 data encoder is used as the data encoder 110, a resulting bit stream may be on the order of 5 Mbits/sec. Accordingly, the short range wireless transmitter should be IEEE 802.11 compliant. It will be recognized that any suitable short range transceiver may be used depending upon the level of compression provided by the data encoder 110. The short range wireless transceiver typically has a range of no more than 100 meters. However, it will be recognized that any suitable short range transceiver may be used that are compliant, for example, with any suitable protocols such as, but not limited to, IEEE 802.11, Bluetooth, Home RF standards, or any other suitable design criteria.

The second unit 200 (FIG. 2), in addition to including the local display 202, includes a second frame buffer 204, the short range wireless receiver 206 and a video decoder 208 that is operatively coupled to the short range wireless receiver 206 and to the second frame buffer 204 and produces decoded video 212 from the received encoded rendered graphics data and recompressed decoded video 145. Once the decoded image frames are stored in the frame buffer 204, a CRT controller 206 or other suitable circuitry obtains the image frames and displays them on the second local display 202.

The short range wireless receiver 206 is preferably a companion receiver to the short range wireless transmitter 108 so that the modulation and demodulation of these transmitters and receivers are fully compliant. Accordingly, the short range wireless receiver 206 may be, for example, of a type compliant with IEEE 802.11, the Bluetooth standard, the Home RF standard or any other suitable short range wireless protocols and/or standards.

The video decoder 208 may be a hardware-based MPEG2, MPEG4 or any other suitable decoder, either in hardware form or may be a software routine executing on a suitably programmed processor that is operatively coupled to the frame buffer 204 through a local bus 212.

The first unit 100 and second unit 200 may be any suitable devices such as laptop computers, Internet appliances, handheld devices, or any other suitable devices. Moreover, the second unit 200 may simply be a monitor having a circuit board containing the short range wireless receiver, video decoder, frame buffer, CRTC operatively coupled to a display array so that the second unit may be a wall mounted display device or a light weight, portable display. In addition, the first unit 100 may also be a simple portable display device having a local display which may display the same image frames as the receiving unit 200. It will be recognized that the first unit 100 and the second unit 200 may be employed as larger or smaller devices or systems as the application requires.

By way of illustration, if a 2.5 gigahertz local area network short range communication system is employed with a peak data rate of 11 Mbits/sec, and the local display 202 of the second unit 200 has a resolution of 1024 pixels by 768 pixels, and assuming a 30 frame per second display rate, it is desirable to have the data encoder 110 compress below 0.3 bits per pixel which would result in approximately a 7.1 Mbit/sec stream using an MPEG II, MPEG 4 or JPEG 2000 compression scheme or other suitable compression scheme.

Referring back to FIG. 1, the video capture port 136 effectively captures the combined graphics and video overlay frame 133 as a YUV422 format stream and stores the resulting frames in the frame buffer. The CPU-based data encoder (such as an MPEG2 compressor) 110 reads the frame buffer and generates a 5 Mbit/sec MPEG2 compliant bit stream that is sent over the USB to the short range wireless transmitter 108, such as a 2.5 gigaherz modulator. Alternatively, if the short range wireless transmitter is resident on the same printed circuit board or integrated circuit as the graphics processing circuit, the CPU-based data encoder can send the 5 megabit per second MPEG2 compliant bit stream over the local bus back to the wireless display circuit 102 for output on the short range wireless transmitter.

With the alternative embodiment of having the hardware data encoder, an advantage arises by not requiring a host CPU to spend processing time re-encoding the video stream. Another advantage of having the short range wireless transmitter 101 on the same printed circuit board and/or integrated circuit as the wireless display circuit, can reduce the bandwidth requirements on the local bus 122 which may have other peripherals communicating thereon. This configuration can result in a potentially faster system.

Figure 3:
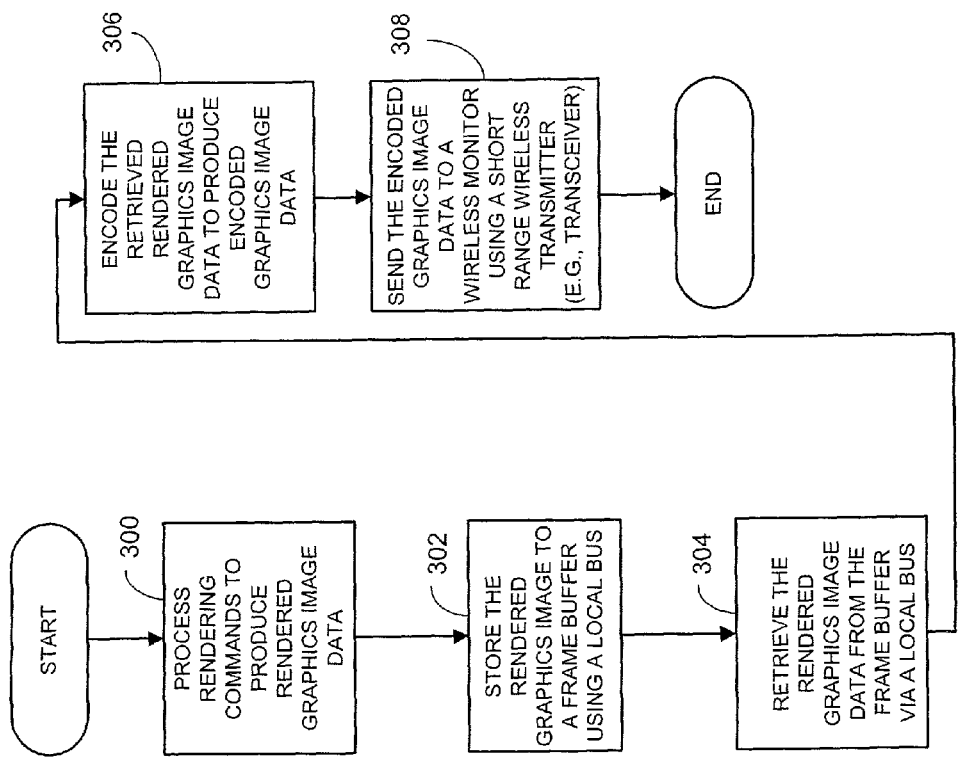
FIG. 3 is a flow chart illustrating one example of a method for providing image data for a wireless display in accordance with one embodiment of the invention.

FIG. 3 illustrates a flow chart representing a method for providing image data for a wireless display such as the local display on second unit 200. The process is carried by the first unit 100. However, it will be recognized that any suitable hardware or software may be used and that any of the following steps may be carried in any suitable order. In this example, the method will be described with reference to a data stream in which no video is present. For example, where conventional word processing programs are used, and/or 3D games are being rendered by the graphics processing circuit, the resulting stream that is encoded may not include video from a video source that provides compressed video.

In this example, as shown in block 300, the graphics processing circuit 104 processes rendering commands from the command buffer 116 to produce rendered graphics image data 117. As shown in block 302, the method includes storing the rendered graphics image data 117 to the frame buffer 114. As shown in block 304, the method includes retrieving the rendered graphics image data 117 from the frame buffer 114 over a local bus, such as local bus 144 and/or local bus 122, using a second processor, such as the host CPU or other suitable processor. As shown in block 306, the method includes encoding by the second processor, the retrieved rendered graphics image data 117 to produce encoded graphics image data. As shown in block 308, the method includes sending the encoded graphics image data, such as via the short range wireless transmitter 108, to a wireless display, such as unit 200, using the short range wireless transceiver 108.

Figure 4:
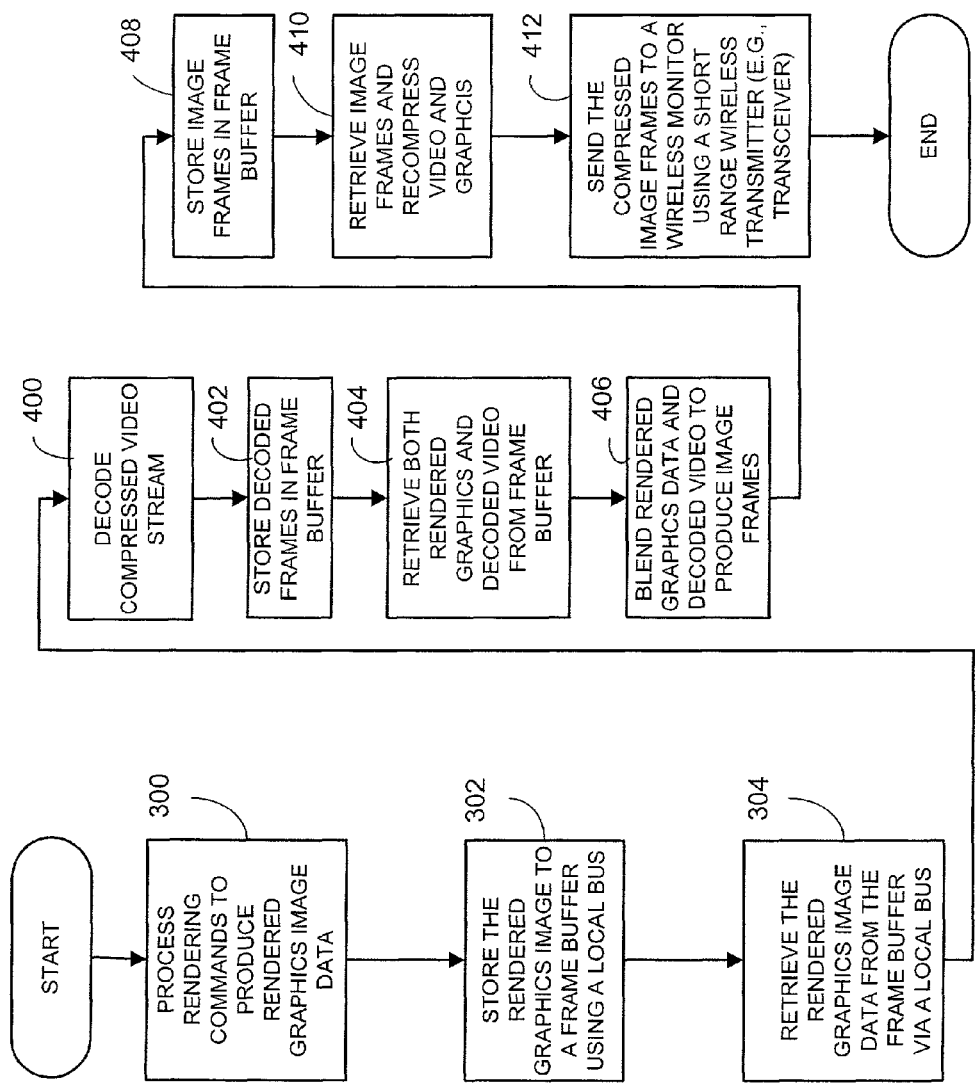
FIG. 4 is a flow chart illustrating one example of a method for providing image data for a wireless display system in accordance with one embodiment of the invention.

Referring to FIG. 4, a method is shown where the compressed frames that are sent via the short range wireless transmitter include both graphics and video information. Accordingly, the method includes receiving the compressed video stream 118, such as from a DVD, cable link, satellite link or any other suitable source, and decompressing the compressed video stream 118 to produce a decompressed video stream 126. Accordingly, the video decoder 106 decompresses the compressed video stream 118 to produce the decompressed video stream 126. This is shown in block 400. As shown in block 402, the method includes storing the decoded video frames in the frame buffer 114. As shown in block 404, the method includes retrieving, such as by the wireless display circuit 102, both the rendered graphics data 117 stored in the frame buffer 114 and the decoded video 126 stored in the frame buffer 114 for combining by the blending circuit 132. Accordingly, the method includes, as shown in block 406, combining (blending) the rendered graphics image data with the decompressed video stream to produce frames of image data 133. This is done, for example, by the blending circuit 132. As shown in block 408, the method includes storing the resulting frames of image data in the frame buffer 114 prior to recompressing the resulting frames of image data 133. This may be done, for example, by activating the multiplexing circuit 140 via the wireless display select bits 144 so that the video capture port 136 captures the frames of image data 133 and stores the frames of image data in the frame buffer 114.

As shown in block 410, the method includes retrieving the frames of image data 133 from the frame buffer, such as by the data encoder 110, and compressing the frames of image data into a video stream such as an MPEG2 or MPEG4 compliant video stream. Accordingly, the originally compressed video 118 is effectively recompressed to produce recompressed video stream when the recompressed video stream includes the encoded graphics information that was blended with the decoded video information by blending circuit 132. As shown in block 412, once the frames of image data have been compressed by the data encoder, the method includes sending the compressed image frames to the wireless monitor 200 using the short range wireless transmitter 108.

The resulting frames of image data 133 output form the blending circuit 132 may also be displayed on the local display 128 after storage in the frame buffer by a CRTC, (not shown) or any other suitable display logic, as known in the art.

Once the compressed, the frames with the recompressed video and encoded graphics data 145 are transmitted via the short range wireless transmitter 108, and the second unit 200 uses the short range wireless receiver 206 to receive the compressed frames 145. The compressed frames 145 are in the form of a compressed video stream that contain graphics data and recompressed video. The video decoder 208 then decompresses the received compressed video stream and produces decompressed image frames 210 and stores them in the second frame buffer 204. The CRTC then outputs the decompressed image frames from the second frame buffer 204 and causes the second local display 202 to display the decompressed image frames on the second local display 202.

FIG. 5 shows an alternative embodiment of a wireless display circuit that includes a switch 500 and a FIFO memory 502 along with memory controller 504 to store the image frames 133 into the frame buffer 114. Accordingly, this embodiment does not require using the video capture port 136. Hence, the video capture port 136 is not unnecessarily tied up during the wireless display select mode. The memory controller 504 may be a conventional memory controller that reads the stored data from the FIFO 502 in a bursty manner, as desired. The wireless display select bits 144 are still used to activate switch 500 which passes the output image frames 133 from the blending circuit 132 to the FIFO 502 during the wireless display select mode. When the wireless display select mode is not activated, the switch 500 disallows storage of the image data 133 into the FIFO 502. Other advantages will be recognized by those of ordinary skill in the art.

FIG. 6 illustrates a configuration wherein the short range wireless transmitter 108 is located on a peripheral card 600 containing a graphics processor, such as a wireless display circuit 102, along with frame buffer 114. Accordingly, a USB host is not required to transmit the compressed graphics data and/or video stream.

FIG. 7 illustrates an alternative embodiment of a set top box having a wireless display receiver that contains the short range wireless receiver which provides the decompressed information to a high definition television. The wireless display receiver 700 may be, for example, a printed circuit board containing the requisite functional blocks previously described including the frame buffer 114, the wireless receiver 206 and in addition a graphics processor to perform graphics rendering with a hardware video decoder and a resident CPU. Associated memory 702 is used by the CPU during boot up. The local display in this example is a high definition television 704. Accordingly, the wireless display receiver 700 may be incorporated as part of a set top box or other device that is operatively coupled to a high definition television. The receiver 700 carries out the same operations as previously described with reference to FIG. 2. With the second processor co-located with the graphics processor, a stand alone-type short range wireless device is created.

As set forth herein, a wireless monitor system is disclosed wherein cabling from an image source to the monitor is eliminated. This may be desirable for LCD projectors, wall displays, handheld devices, or any other suitable devices. The rendered graphics that results from the rendering using rendering commands may be compressed and sent, and/or combined video and graphics frames may be compressed wherein the video was previously compressed and then again recompressed by the disclosed methods and apparatus.

Alternatively, in addition to or instead of sending only recompressed images, the system may also send rendering commands between the transmitter 108 (i.e., wireless drawing command transmitting unit) and the receiver 200 to allow some shadow rendering by the receiver 200. The wireless drawing command transmitting unit may be, for example, a laptop computer, communication device, Internet appliance, display device, work station or any other suitable device that displays images. For purposes of illustration, and not limitation, the wireless drawing command transmitting unit will be referred to as a laptop computer with a local (wired) display screen, such as an LCD. As such, the wireless drawing command transmitting unit may have an associated operating system, a graphics controller driver and one or more software applications, such as a presentation package, video game or any other suitable application which requires the use of drawing commands, such as high level drawing commands sent from the application to the operating system. In addition, the operating system sends high level drawing commands to the graphics controller driver as known in the art.

The wireless drawing command transmitting unit may be, for example, a graphics accelerator chip having a master renderer, such as a 2D or 3D rendering engine, as known in the art. In addition, the wireless drawing command transmitting unit 102 includes a drawing command buffer, a set of drawing control registers, the short range wireless transceiver and a frame buffer, which may be system memory or a local frame buffer as desired. The short range wireless transceiver may be, for example, a radio frequency-based wireless transceiver such as one that operates according to the Bluetooth standard IEEE 802.15.1, IEEE 802.11b or other suitable RF standards, as known in the art, or any other suitable RF or optical wireless transceiver.

A wireless drawing command receiving unit (receiver 200) includes a shadow image renderer, such as another graphics accelerator of the same type as master renderer. The shadow image renderer includes a set of drawing control registers, and a drawing command buffer. The wireless drawing command receiving unit also includes a wireless transceiver which is of the same type as wireless transceiver, and an additional frame buffer along with a display screen. The display screen may be physically separate from the receiving unit. The wireless drawing command receiving unit may be a separate box or unit that plugs into the display.

The wireless drawing command transmitting unit uses the wireless transmitter to transmit drawing commands from the command buffer. The drawing commands are also associated with the master image renderer so that the same drawing commands in the same order are sent and used by the wireless drawing command transmitting unit for use by the wireless drawing command receiving unit. The wireless drawing command receiving unit is operatively coupled to the drawing command transmitting unit via a wireless link provided by the wireless transceivers. The drawing commands are suitably modulated by the wireless transceiver and sent as wireless drawing commands to the wireless transceiver. The wireless transceiver includes a wireless receiver that is operative to receive the transmitted drawing commands for storage in command buffer. The wireless drawing command receiving unit includes a shadow renderer that in this embodiment is identical to the master renderer so that the same commands are processed in the same order. In addition, the same image is displayed on the two display screens. The drawing command receiving unit transmits drawing command throttle data back to the wireless drawing command transmitting unit to allow the wireless drawing command transmitting unit to throttle transmission of drawing commands that are communicated wireless, namely wireless drawing commands. The throttle mechanism ensures that the command buffer does not proceed to the next rendering command, or set of commands, unless both the slave and master renderers are ready to receive the commands.

The drawing command buffer stores drawing commands for the master image renderer. The wireless transceiver transmits drawing commands obtained from the command buffer or from any suitable source to the wireless drawing command receiving unit. The drawing commands are associated with the master image renderer and are used to render an image stored in frame buffer. The first display screen is operatively coupled to the master renderer. The frame buffer may be, for example, dedicated system memory, or memory associated with the wireless drawing command transmitting unit. The local (wired) display screen outputs rendered images from the frame buffer as provided by the master renderer.

The command buffer of the wireless drawing command receiving unit is operative to store received drawing commands from the drawing command transmitting unit for use by the shadow image renderer. The frame buffer is operatively coupled to the shadow image renderer and finally rendered images are provided to the display screen from frame buffer via the shadow image renderer.

In this embodiment, the drawing command transmitting unit includes the drawing control registers that are operatively coupled to the wireless transceiver such that the wireless transceiver transmits both wireless drawing commands and drawing control register status via the wireless link for the shadow image renderer. The drawing control register status is then stored in the control registers of the wireless drawing command receiving unit so that both the drawing command transmitting unit and the drawing command receiving unit have the same control register data so that each of the rendering devices can render the same image at substantially the same time.

Since conventional monitors may use, for example, a monitor identification scheme such as extended display information data (EDID) upon power-up, an LCD panel or other monitor device is queried by a graphics accelerator or other device and returns the display resolution information, monitor type or any other suitable monitor identification information. In this embodiment, the wireless drawing command receiving unit sends monitor identification data, such as EDID information, or any other suitable information on a wireless back channel to the wireless drawing command transmitting unit to identify for the wireless drawing command transmitting unit the type of display screen and the necessary resolution to provide the requisite monitor synchronization information via the wireless transceiver. This detection operation may be optional depending upon the type of system involved.

The master and slave renderers each contain display controllers to refresh images from frame buffers to display screens. These display controllers (not shown) are controlled by control registers. Preferably, both the local and wireless displays are have the same resolution, bit depth and refresh rate. However, refresh rates and timings do not need to match. Bit depths must match. It will be recognized that resolutions need not match if standard virtual desktop systems are used on either display.

The wireless drawing command transmitting unit throttles transmitted drawing commands sent via the wireless link in response to the drawing command throttle data sent from the wireless drawing command receiving unit. Slave command buffer may send status or start/stop data based on available entries in its buffer. If fewer than a high watermark of entries are available then the slave renderer sends stop data. Once the buffer is drained to more than a low watermark, the slave renderer sends start data. Other buffer management techniques may also be used. In addition, packet transmission may be used wherein the wireless transceiver does not acknowledge packets when buffer does not have room more commands. This can reduce use of the back channel.

With the above embodiment using the same graphics accelerators employed by both the master renderer and the shadow image renderer, the same command stream is used for both renderers. In this embodiment, typically, no operating system command routing is necessary between the wireless drawing command transmitting unit and the wireless drawing command receiving unit.

For example, a same command stream is used to render images for both the master renderer and the shadow image renderer. In addition, in this embodiment, the same command requester is used for both the master image renderer and the shadow image renderer. A system interface provides an interface, as known in the art, between a system bus that is used by the host CPU and system memory. Any suitable memory may be used to store commands sent by the host CPU under control of an application, for example. In this embodiment, a portion of frame buffer is used as a command ring buffer. However, it will be recognized that system memory may include a suitable command ring buffer, or any other suitable storage mechanism may be used.

Since sometimes the master renderer may not perform drawing commands rendering but instead certain drawing commands may be processed by the host, a host data path is provided by the wireless drawing command transmitting unit to allow the host CPU to read and write data to frame buffer which may be performed over a suitable bus. As noted above, the master renderer may include one or more rendering engines such as a 2D and/or 3D rendering engine as known in the art. Accordingly, the master renderer may read data from the frame buffer and write final rendering images to the frame buffer. The final rendered image is then output to a display control device such as a CRTC or other suitable device as known in the art which then sends the requisite pixel information and synchronization information to the display as known in the art.

The command requester, as known in the art, requests drawing commands from the command ring buffer or any other suitable location or directly from the system interface when commands are needed by the rendering engine. As shown, drawing commands may be parsed rendering commands or unparsed rendering commands, depending upon the command format used in the system. As shown, where unparsed commands are understandable by the wireless drawing command receiving unit, they may be passed through a multiplexer to the wireless transmitter and sent as wireless drawing commands. If parsed rendering commands are needed, parsed rendering commands are passed through multiplexer and sent to the rendering command buffer and also to multiplexer. A multiplexer control signal is used to control the multiplexers as needed. Accordingly, multiplexer may output either unparsed rendering commands or parsed rendering commands depending upon the particular command stream needed. In addition, if desired, as shown by dashed line, commands from the CPU may also be passed to the rendering command buffer and sent out through the wireless transmitter through multiplexers, if desired.

To insure that drawing control registers are the same in both the master image renderer and the shadow image renderer, the graphics accelerator driver accesses registers in the wireless drawing command receiving unit via wireless transceiver direct access over a wireless channel. Accordingly, the driver being run on the wireless drawing command transmitting unit can read and write registers associated with the shadow image renderer. Drawing control register writes are provided both to the drawing control register and are also wirelessly sent to wireless transmitter for updating control registers. In addition, frame buffer writes controlled by the host CPU, for example, to the host data path, are also communicated wirelessly to the shadow image renderer so that the frame buffer appears to be identical to the other frame buffer. For example, host processor write data, which may be the same as write data of the receiver, is also sent wirelessly as a wireless drawing command and a frame buffer write to the wireless drawing command receiving unit. Accordingly, frame buffer reads associated with one frame buffer occur for the wireless drawing command transmitting unit only. However, frame buffer writes that are performed by the wireless drawing command transmitting unit to the other frame buffer also occur to the frame buffer associated with the shadow image renderer when the system is in a shadow rendering mode. One advantage of this operation is to allow the savings of wireless channel bandwidth and back channel bandwidth for throttling purposes since only writes are communicated to the shadow image renderer automatically when in a shadow rendering mode.

The wireless drawing command receiving unit may be switchable between a shadow image rendering mode and a non-shadow image rendering mode. For example, in this embodiment, a wireless drawing command receiving unit 200 is switchable between a wireless shadow image rendering mode and an independent rendering mode such as if the wireless drawing command receiving unit was part of a host CPU system which executed its own drawing application or a recompression image receiving mode. With this type of wireless drawing command receiving unit, a system may either simultaneously present the same image on the master display screen and the shadow image display screen or provide different images on the two different screens depending upon whether the shadow mode was in operation.

The wireless drawing command receiving unit includes a shadow mode switch that may be implemented via hardware or software and may be switched, for example, by a bit or other data sent in a control bit stream or any other bit stream as received from the wireless drawing command transmitting unit to activate remotely the shadow image rendering mode. Alternatively, the shadow mode switch may be activated by a user through a graphic user interface or it may be a hard switch, for example, accessible by a user of the wireless monitor.

In this embodiment, the wireless transceiver receives a shadow mode flag or bit in a wireless control channel to activate the wireless drawing command receiving unit to act as though it is a shadow image renderer so that the same images are presented on both the display screen and the local display screen. Operation is carried out as previously described. The shadow mode switch generates an activation signal to activate the shadow image renderer so that it knows to obtain information via the wireless link form the master image renderer. If the shadow mode switch is off, the shadow image renderer will obtain rendering commands from a host CPU and an associated drawing application, for example, directly, as opposed to the wireless link.

In another embodiment of a wireless drawing command transmitting unit, the master image renderer may be a different type of image renderer (e.g., different manufacturer, model, speed, etc.) from the shadow image renderer. Accordingly, different command streams are used for the master renderer and the shadow renderer. In this embodiment, separate command requesters are used such that a separate shadow command requester is used in addition to a master command requester. In addition, separate command ring buffers are used so that an additional shadow command ring buffer is used to store drawing commands as used by the shadow image renderer and the command ring buffer stores drawing commands used by the master image renderer. Also as shown, host CPU writes to the frame buffer are not communicated to the shadow image renderer and the frame buffer contents for frame buffer will be different from the frame buffer contents. In addition, the wireless receiver receives the back channel command throttling data, passes the command throttle information to the shadow command requester to throttle the output of wirelessly communicated commands to the wireless transmitter. Accordingly, there may not be one to one correspondence between the content of the remote frame buffers. However, preferably, a software application or driver is aware of the two displays being used.

In another embodiment, different renderers could be used and different commands streams, but the same image is displayed on both displays such that a driver hides the command streams differences or performs translations of commands so that differing renderers could be used.

A method for providing wireless display of an image that may be carried out by the above embodiments includes generating and transmitting wireless drawing commands for a wireless shadow display device. The method includes receiving wirelessly transmitted drawing commands for use by an image rendering engine such as that associated with a shadow image renderer. The method includes determining a shadow image renderer command queue level by evaluating, for example, a command read pointer, or watermark levels associated with a shadow image renderer command buffer to determine whether the shadow image renderer requires additional commands or if an overflow is occurring. This is done to determine drawing command throttle data. Where the master image renderer and the shadow image renderer are the same type of (e.g, use same command set) graphics accelerator chips, for example, a master image renderer waits until a shadow image renderer and the master image renderer request the same number of command bytes. For example, either the master image renderer requests commands which are then sent wirelessly or the shadow image renderer requests additional commands be sent via the throttling data in the back channel for a start and stop operation. Alternatively, a specified number of commands can be requested.

The method includes generating and transmitting wireless drawing command throttle data to the master renderer to throttle the number of drawing commands sent wirelessly. The method includes receiving, such as by the wireless drawing command transmitting unit, the wireless drawing command throttle data. Once received, the wireless drawing command transmitting unit determines the number of commands required to be sent to the shadow image renderer to insure that the same image is being displayed on a wireless monitor. The method includes determining whether to allow the master drawing command requester or the shadow command requester to obtain rendering commands. This may occur, for example, where a plurality of differing command requesters are used as part of the drawing command transmitting unit. If, for example, the wireless drawing command throttle data indicates that the shadow image renderer requires additional commands, the shadow command requester will request the suitable number of commands indicated in the throttle data and transmit these commands through the transmitter. If, however, the master image renderer requires commands, the master image requester will provide the requisite number of commands to the command buffer associated with the master image renderer. Accordingly, the above method includes transmitting via a wireless communication link for a first image rendering engine, such as a shadow image renderer, drawing commands associated with a second image rendering engine, such as a rendering engine associated with the master image renderer. The method also includes storing drawing commands for each of the respective image rendering engines such that drawing commands are stored that have been transmitted by drawing command transmitting units for use by a shadow image rendering image.

In addition to wirelessly communicating drawing commands, the method includes wirelessly sending frame buffer write commands to a wireless drawing command receiving unit for writing data to a frame buffer associated with the shadow image renderer, to facilitate the correspondence between remote first and second frame buffers. In addition, the method includes wirelessly transmitting the same control register data generated for a master rendering engine to a wireless drawing command receiving unit for use by a second rendering engine, such as a rendering engine associated with a shadow image renderer.

The above structures and methods provide a wireless monitor and system. Shadow rendering by wireless devices are provided wherein drawing commands are communicated wirelessly to avoid high bandwidth transmission of rendered pixel data to facilitate a wireless link between a monitor, for example, and an image rendering source. In addition, drawing command throttling data is sent form the wireless monitor back to the drawing command transmitting unit to suitably throttle the number of drawing commands as needed by the shadow image renderer to insure, for example, suitable timing of the same image displayed on a plurality of display screens. The operating system and graphics driver may be unaware that the shadow renderer is present in the system, for example if the wireless receiving unit is the exact same type of renderer as the master. The invention may be applicable to many devices that employ a display device. Other advantages will be recognized by those of ordinary skill in the art.

It should be understood that the implementation of other variations and modifications of the invention in its various aspects will be apparent to those of ordinary skill in the art, and that the invention is not limited by the specific embodiments described. For example, the control bits 144 may not be necessary where the units are always configured as wireless display devices. Also, the blending circuit operations or other circuit operations may be carried out by the CPU or other processor. It is therefore contemplated to cover by the present invention, any and all modifications, variations, or equivalents that fall within the spirit and scope of the basic underlying principles disclosed and claimed herein.

What is claimed is:

1. A method for providing image data for a wireless monitor comprising:
   in a device:
   processing graphics drawing commands to render graphics data using a first processor to produce rendered graphics image data and storing the rendered graphics image data to a frame buffer;
   retrieving the rendered graphics image data from the frame buffer over a local bus using a second processor;
   determining whether a wireless display mode has been selected;
   in response to selection of the wireless display mode, encoding, by the second processor, the retrieved rendered graphics image data to produce encoded graphics image data;
   sending the encoded graphics image data to a wireless monitor using a short range wireless transmitter in response to selection of the wireless display mode; and
   wherein if a wireless display mode has been selected, controlling the rendered graphics image data to be restored to the frame buffer.

* * * * *